United States Patent [19]

Hanlan

[11] 4,361,260

[45] Nov. 30, 1982

[54] WEB REGISTRATION CONTROL

[76] Inventor: Marc A. Hanlan, 1501 S. Mason St., Appleton, Wis. 54911

[21] Appl. No.: 163,569

[22] Filed: Jun. 27, 1980

[51] Int. Cl.[3] .................... B65H 23/18; G06F 15/46

[52] U.S. Cl. .................................... 226/30; 364/469; 101/248

[58] Field of Search ..................... 226/30, 31, 27, 28, 226/29, 42, 43; 235/474, 475, 476, 481; 101/32, 248; 53/51; 270/52; 364/469

[56] References Cited

U.S. PATENT DOCUMENTS

| | | | |
|---|---|---|---|
| 3,055,246 | 9/1962 | Steinberg | 83/74 |
| 3,468,201 | 9/1969 | Adamson et al. | 83/74 |
| 3,490,048 | 1/1970 | McDowell | 328/168 |
| 3,525,858 | 8/1970 | Thiede et al. | 226/28 X |
| 3,556,509 | 1/1971 | Crum | 270/52 |
| 3,559,568 | 2/1971 | Stanley | 101/32 |
| 3,583,128 | 6/1971 | Johnson | 53/51 |
| 3,594,552 | 7/1971 | Adamson | 226/29 X |
| 3,601,587 | 8/1971 | Thiede | 226/28 X |
| 3,624,359 | 11/1971 | Roote | 226/28 X |
| 3,774,016 | 11/1973 | Sterns et al. | 226/28 X |
| 3,899,946 | 8/1975 | Niepmann | 226/191 X |
| 4,264,957 | 4/1981 | Pautzke | 364/469 |

*Primary Examiner*—Leonard D. Christian

*Attorney, Agent, or Firm*—Andrus, Sceales, Starke & Sawall

[57] ABSTRACT

A register control (21) is provided for a web handling apparatus (22) having a drive motor (29) operatively moving a web (23) containing repetitive indicia (34) through a sequencially operating function apparatus (27) performing repetitive operations on the web. A control (41) responds to the speed of the drive motor (29) and the position of the function apparatus (27) and the position of the indicia (34) to provide a speed command signal ($V_c$) to a full wave regenerative thyristor control circuit (38) to operatively control the operating speed of a pair of nip rolls (25, 26) through the controlled energization of a corrective motor (35) to maintain registration between the function apparatus (27) and the indicia (34). The control (41) provides a timed modification to a sensed speed signal $V_s$ for providing a modified speed command signal ($V_c$) when the system is out of registration. A speed command modification circuit (213) responds to an advance modification timing circuit (79) and an advance coincidence circuit (81) to increase the speed of the correction motor (35) and responds to a retard timing modification circuit (78) and a retard coincidence circuit (80) to decrease the operating speed of the correction motor (35).

15 Claims, 19 Drawing Figures

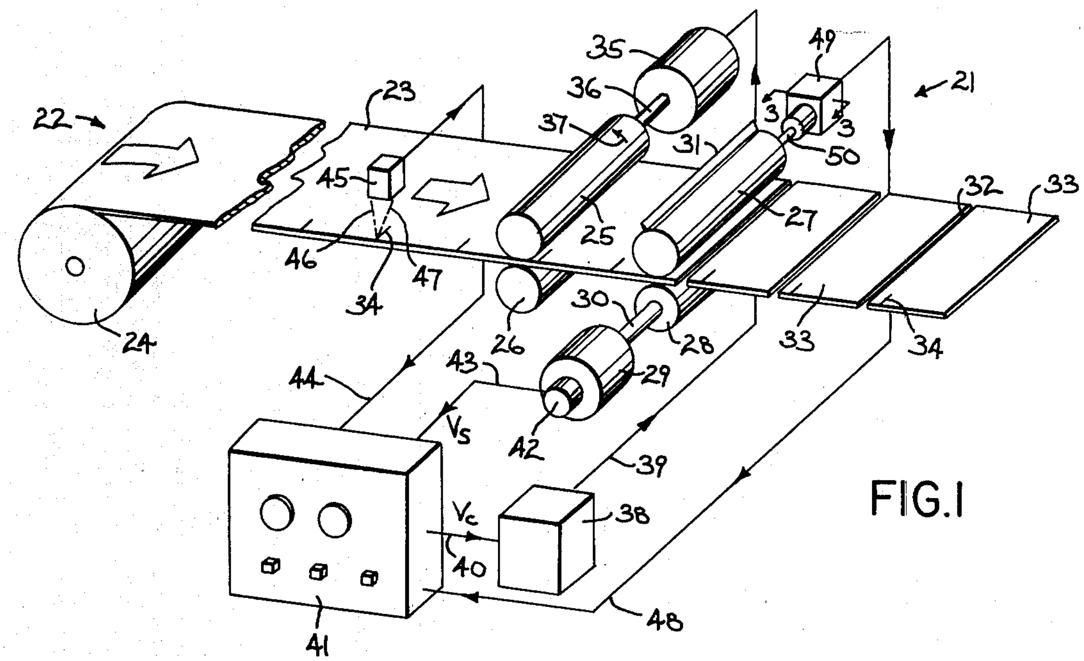
FIG.1
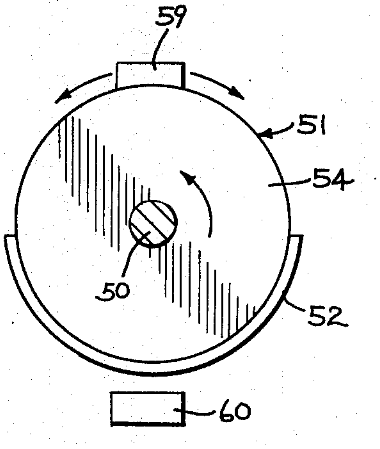
FIG.3
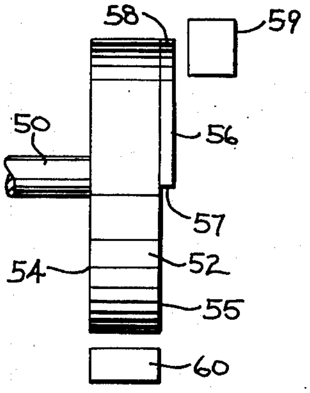
FIG.4
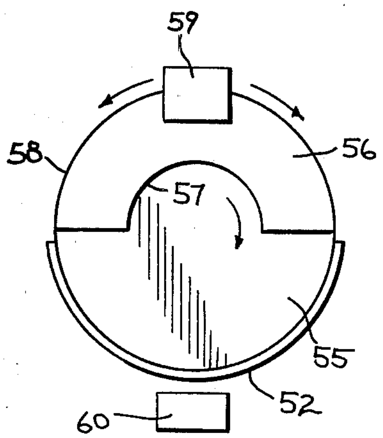
FIG.5
FIG.6
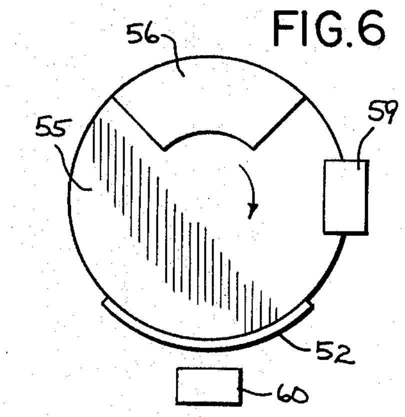
FIG.7
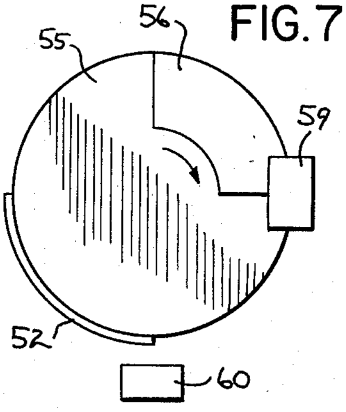
FIG.8
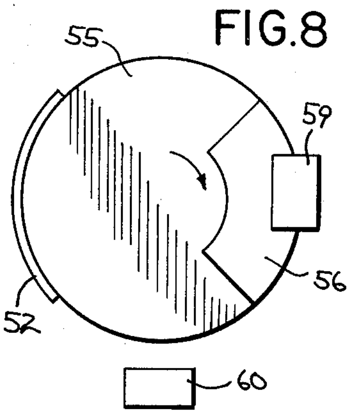

WEB REGISTRATION CONTROL

BACKGROUND OF THE INVENTION

The invention relates to a web registration control for web handling apparatus having motive means operatively moving a web containing repetitive indicia through a sequencially operating function apparatus performing repetitive operations on the web corresponding to the repetitive indicia.

Web material, such as paper, film, tape etc., is employed for various uses in the printing industry, paper converting industry, packaging industry and the like. Frequently, such web material is continuously fed through processing machinery and subjected to one or more processing operations thereon. For example, a function apparatus might include a knife which is sequentially operated to sever the web material into sheets of substantially equal length for further use or processing. As another example, the function apparatus might print or emboss such film with repetitive patterns or written material. As another example, the function apparatus might puncture the web material. Thus whatever function is being applied to the web material, it is important that the repetitive operations of the function apparatus are performed in registration with appropriate web sections. It has been customary in the web processing industry to utilize repetitve indicia on the web which are detected for controlling the operation of the web handling apparatus and, when an out of register condition is found, to modify the operation of such web handling apparatus to attempt to regain registration.

BRIEF SUMMARY OF THE INVENTION

A register control is provided for web handling apparatus having motive means operatively moving a web containing repetitive indicia through a sequencially operating function apparatus performing repetitive operations on the web corresponding to the repetitive indicia.

A speed control circuit responds to the speed of the motive means and the position of the function apparatus and the position of the indicia to provide a speed command signal for controlling the operating speed of the motive means to maintain registration between the function apparatus and the indicia.

A drive circuit responds to the speed command signal to energize a corrective motor which operates associated nip rolls which engage and move the web at a speed relating to the speed command signal. In a preferred form of the invention, the drive circuit includes a thyristor controlled circuit which energizes the corrective motor in response to the speed command signal.

A sensing circuit responds to the position of the function apparatus and the position of the indicia to provide a coincidence signal in response to the function apparatus being out of register with the indicia. A timing circuit responds to such coincidence signal and varies the operating speed of the motive means for a predetermined period of time in response to the coincidence signal to regain registration between the function apparatus and the indicia.

The timing circuit also includes a portion which responds to a plurality of coincidence signals to vary the operating speed of the motive means for a second predetermined period of time greater than the first predetermined period of time to regain registration between the function apparatus and the indicia.

A modifying circuit is operatively connected to receive the speed signal and operates to provide the speed command signal. Such modifying circuit is selectively operable between a first condition to provide a first speed command signal and a second condition to provide a second speed command signal. A transfer circuit is operably connected to respond to the position of the function apparatus and to the position of the indicia to transfer such modifying circuit from the first condition to the second condition in response to the function apparatus being out of register with the indicia to thereby provide the second speed command signal to modify the operation of the motive means to regain registration between the function apparatus and the indicia.

The modifying circuit may include an operational amplifier having an input operatively connected to an impedance circuit and provides an output which operatively provides the first and second speed command signals. The transfer circuit includes a switch connected to the impedance circuit and operable between a first condition to provide a first operative impedance to provide the first speed command signal and a second condition to provide a second operative impedance to provide the second speed command signal.

The modifying circuit may include an operational amplifier having an input operatively connected to a sensor and an output operatively providing the first and second speed command signals whereby such amplifier has a feedback impedance circuit coupling the output to the input of such amplifier. The transfer circuit includes a switch which is connected to such feedback impedance circuit and is operable between a first condition to provide a first operative impedance for producing the first speed command signal and a second condition to provide a second operative impedance for providing the second speed command signal.

The modifying circuit may include an analog-to-digital converter which is operably connected to a sensor for providing a digital output having a frequency related to the magnitude of the analog speed signal input. An opto-isolator has an input operatively connected to the analog-to-digital converter. and responds to such digital output to provide an optically isolated digital output corresponding in frequency to the digital output. A digital-to-analog converter is operatively connected to receive the optically isolated digital output from the opto-isolator and provides an analog speed command signal having a magnitude relating to the digital output.

In a preferred construction, three sensors are provided, one to monitor the drive motor to provide a speed responsive signal, another to monitor the function apparatus to provide a function indicating signal and another to scan the web to provide an indicia indicating signal.

The function position sensor includes a member which rotates in synchronism with the repetitive operation of the function apparatus. First and second permanent magnets are connected to the member and are circumferentially spaced from each other. First and second magnetic sensors are connected to monitor the magnetic field strengths of the first and second magnets, respectively. The first and second magnetic sensors are angularly adjustable with respect to each other to provide a pre-established dead sensing zone and a selectively adjustable advance sensing zone and retard sensing zone. In such construction, the first magnetic sensor provides an advance pulse in response to the first magnet being within the advance zone while the second magnetic sensor provides a retard pulse in response to the second magnet being within the retard zone.

An advance coincidence circuit responds to the simultaneous occurrence of an advance pulse and an indicia indicating signal to provide an advance coincidence pulse to command an advance correcting sequence. A retard coincidence circuit responds to the retard pulse and an indicia indicating signal to provide a retard coincidence pulse to command a retard correcting sequence.

The invention provides a highly desirable web register control which may be interconnected to any one of a number of web handling apparatus. For example, the invention may be incorporated to monitor and/or modify the operation of either D.C. or A.C. motors and may be interfaced with stepping motor controls or with servo motor applications. Further, certain aspects of the invention may be interfaced with a wide variety of different web handling apparatus and sensors. The invention contains many advantages for set-up and adjustment which have been found to be highly desirable.

BRIEF DESCRIPTION OF THE DRAWINGS

The drawings furnished herewith illustrate a preferred construction of the invention in which the above advantages and features are clearly disclosed, as well as others which will be clear from the following description.

In the drawings:

FIG. 1 is a diagramatic illustration of a register control system in accordance with the present invention;

FIG. 3 is a fragmented sectioned view taken along the lines 3—3 in FIG. 1 and diagramatically illustrating a portion of the function position sensor.

FIG. 4 is a side elevational illustration of the function position sensor portion of FIG. 3;

FIG. 5 is a rear view of the function position sensor portion of FIG. 3;

FIG. 6 is another view of the function position sensor portion of FIG. 3 but with trimmed permanent magnets and illustrating a sensed retard correction condition;

FIG. 7 is another view of the function position sensor portion of FIG. 6 and illustrating a sensed dead zone condition;

FIG. 8 is another view of the function position sensor portion of FIG. 6 and illustrating a sensed advance correction condition;

DETAILED DESCRIPTION OF THE PREFERRED EMBODIMENT

Figure 2:
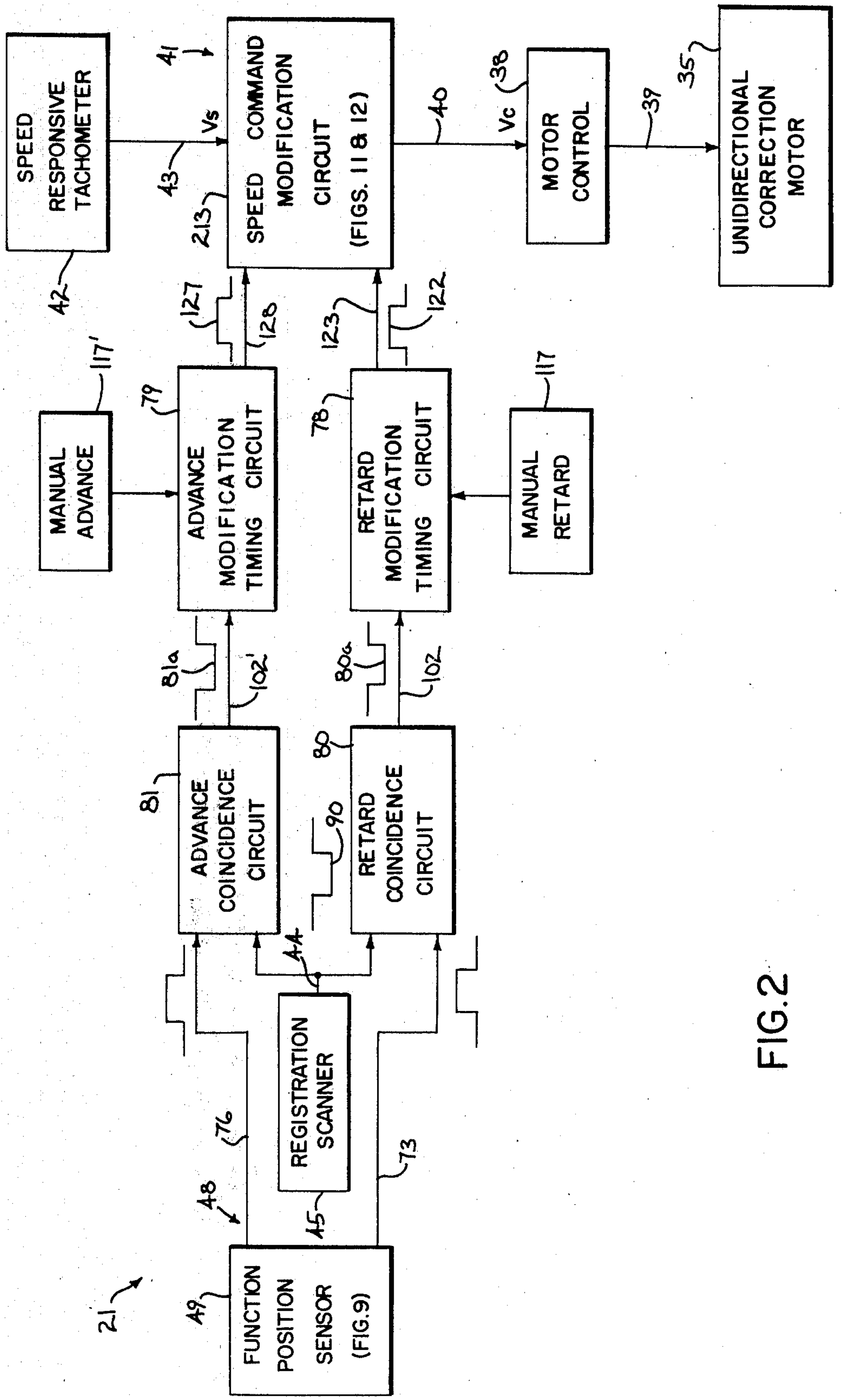
FIG. 2 is a diagramatic block illustration of the electrical control used in the register control system of FIG. 1.

A register control system 21 is applied to a conventional web handling and processing apparatus 22. A sheet of webbed material 23, such as pliable film or the like, is withdrawn from a spool 24 of wound film by the driving tension supplied by a pair of draw rolls 25 and 26 and a pair of function rolls 27 and 28. The function roll 28 is unidirectionally rotated by a main drive motor 29 through a suitable drive shaft 30. The function roll 27, on the other hand, provides an axially extending knife or edge 31 which is rotated through driving pressure exerted by function roll 28 so as to engage film 23 during each revolution thereof. In such manner, the knife or blade 31 severs film 23 during each rotation as illustrated at 32 to divide the film 23 into a plurality of sections 33 each having a substantially uniform length. In operation, the register control system 21 operates to accurately separate each sheet 33 so that the separation or cut 32 is at a precise location relative to a mark or indicia 34 located on film 23. It is understood, however, that the invention may be used with any one of a number of function producing apparatus which repetitively performs an operation to the web 23, such as punching, printing, embossing, etc.

To provide precise operating control over the speed of movement of film 23, the draw roll 25 is continuously and uni-directionally rotated by a correction motor 35 through an appropriate shaft 36.. In such manner, the draw roll 25 is continuously operated under precise control, as more fully set forth hereafter, in a counterclockwise direction as illustrated at 37. The correction motor 35 may consist of any suitable A.C. or D.C. motor such as, for illustrative purposes only and without limitation, a permanent magnet direct current motor which is commercially available from many sources. The correction motor 35 is energized by a motor control 38 through connecting circuitry 39. The motor control 38 may consist of any suitable control which is capable of receiving a selectively variable command signal $V_c$, such as supplied at an input circuit 40, to precisely control the operation of the correction motor 35 in response to such command signal $V_c$. For example, one such motor control 38 may utilize a full wave regenerative, thyristor controlled motor speed control, such as commercially available from Poly Speed, Inc. of Dallas, Texas and marketed under Model No. PRD-8.

The command signal $V_c$ at connecting circuit 40 is supplied by a registration control circuit 41 which responds to a plurality of sensed conditions to generate the command signal $V_C$ and precisely and accurately control the operation of the correction motor 35. The main drive motor speed $V_S$ (sometimes referred to as "line speed") is supplied to the registration control 41 from a tachometer 42 through a connecting circuit 43. The tachometer 42 is connected to monitor the speed of the main drive motor 29 and provides a line speed signal $V_S$ which is related to the moving speed of web 23.

The registration control 41 is connected through a connecting circuit 44 to a registration scanner 45. The registration scanner 45 includes a light transmitter and receiver which projects a ray of light, as at 46, onto the film 23 with such light ray being reflected, as at 47, to be received by the scanner 45. The scanner 45 operates in response to a sensed mark 34 to provide an output signal through the connecting circuit 44 to the registration control 41. The registration scanner 45 may be selected from any one of a number of commercially available scanners, such as marketed by the Warner Electric Brake and Clutch Company of Beloit, Wisconsin under Model No. MCS-624.

The registration control 41 is also connected through a connecting circuit 48 to a phase or function position sensor 49. The sensor 49 is connected through a shaft 50 to receive a mechanical rotative input from the function roll 27. As illustrated diagramatically in FIGS. 3–5, the sensor 49 includes in part a disk 51 which is rigidly connected to rotate with function roll 27 through shaft 50. The sensor 49 is manufactured with an arc shaped permanent magnet 52 fixedly attached to approximately a one hundred and eighty degree circumferential outer portion of disk 51. In such manner, the permanent magnet 52 appears as a half circle and is between oppositely spaced disc end walls 54 and 55. A second arc shaped permanent magnet 56 forms a half circle and is secured to the sidewall 55. The permanent magnet 56 extends radially from a first inner surface 57 to a secured outer surface 58. The permanent magnets 52 and 56 lie in separate vertical and horizontal planes and, when viewed along the axis of disk 51, form in effect a substantially circular ring of magnetism.

A pair of sensors 59 and 60 are mounted adjacent to disk 51 and monitor the relative magnetic field strengths provided by magnets 52 and 56 as they rotate in conjunction with the function roll 27. The sensors 59 and 60 may be selected from any one of a number of commercially available magnetic field sensors, such as provided by Sprague under the designation UGN-3020T, which operate as a Hall effect switch with an integral Schmidt trigger. In any event, the retard sensor 60 is fixedly connected to a housing (not shown) of sensor 49 so as to monitor the permanent magnet 52. The advance sensor 59, however, is movably mounted to the housing of sensor 49 so as to be manually rotated for positioning at any desired location around the outer circumference of disk 51 to monitor the permanent magnet 56.

When installing the sensor 49 in the field, the permanent magnets 52 and 56 may be trimmed to provide a selectively pre-settable advance and retard scanning zones or windows for varied applications. For example, the permanent magnet 52 in FIGS. 6–8 has been trimmed to provide about a ninety (90) degree arc. In other words, approximately forty five (45) degrees of both circumferential ends of permanent magnet 52 have been trimmed away to provide a reduced magnetic field thereat. In like manner, the permanent magnet 56 has been trimmed to provide about ninety (90) degrees of permanent magnet by similarily trimming away approximately forty five (45) degrees of the circumferential ends of magnet 56 to reduce the magnetic field thereat. The operating example illustrated in FIGS. 6–8 shows the advance sensor 59 rotated about ninety (90) degrees from the position illustrated in FIGS. 3–5.

Figure 9:
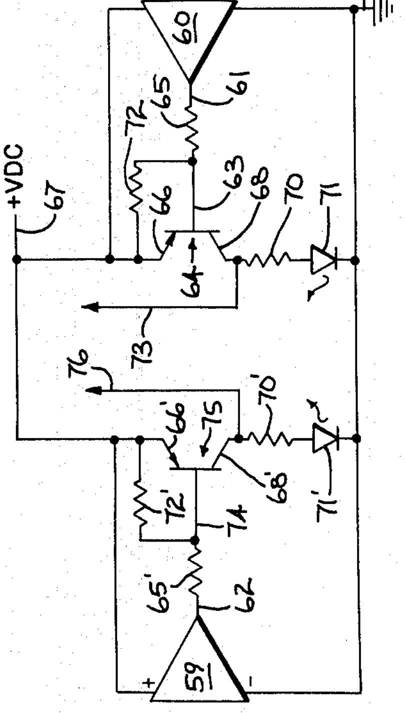
FIG. 9 is an electrical circuit schematic showing a portion of the function position sensor of FIG. 1.

A portion of the electrical circuits of sensors 59 and 60 are illustrated in FIG. 9. When the central portion of permanent magnet 52 approaches the retard sensor 60, as illustrated in FIG. 6, a logic "1" retard pulse appears at an output 61. In similar manner, when the central portion of permanent magnet 56 approaches the advance sensor 59, as illustrated in FIG. 8, a logic "1" advance pulse appears at an output 62. When the advance sensor 59 is spaced from the central portion of permanent magnet 56 and the retard sensor 60 is spaced from the central portion of permanent magnet 52, both switches 59 and 60 will remain inactive and maintain logic "0" signals at outputs 62 and 61, respectively.

The output 61 of sensor 60 is connected to a base circuit 63 of a PNP type transistor 64 through a connecting resistor 65. The transistor 64 has an emitter circuit 66 connected to a constant positive potential source lead 67 and a collector circuit 68 connected to a circuit common 69 through a serially connected circuit including a resistor 70 and a light emitting diode 71. The base circuit 63 is also coupled to the constant potential lead 67 through a resistor 72. When a logic "1" retard pulse appears at output 61 of sensor 60, the transistor 64 turns on to provide a logic "1" signal at an output circuit 73.

The output 62 of sensor 59 is likewise connected to a base circuit 74 of a PNP type transistor 75. In that transistor 75 is constructed and operates in a similar manner as described with respect to transistor 64, the similar associated elements will be identified by identical numbers primed and further description thereof is deemed unecessary. When an advance logic "1" pulse appears at output 62 of sensor 59, the transistor 75 is rendered conductive to provide a logic "1" signal at an output circuit 76. If neither sensor 59 and 60 provide either a retard or an advance pulse, the outputs 61 and 62 will remain at logic "0" and logic "0" signals will be established at outputs 73 and 76.

Figure 10:
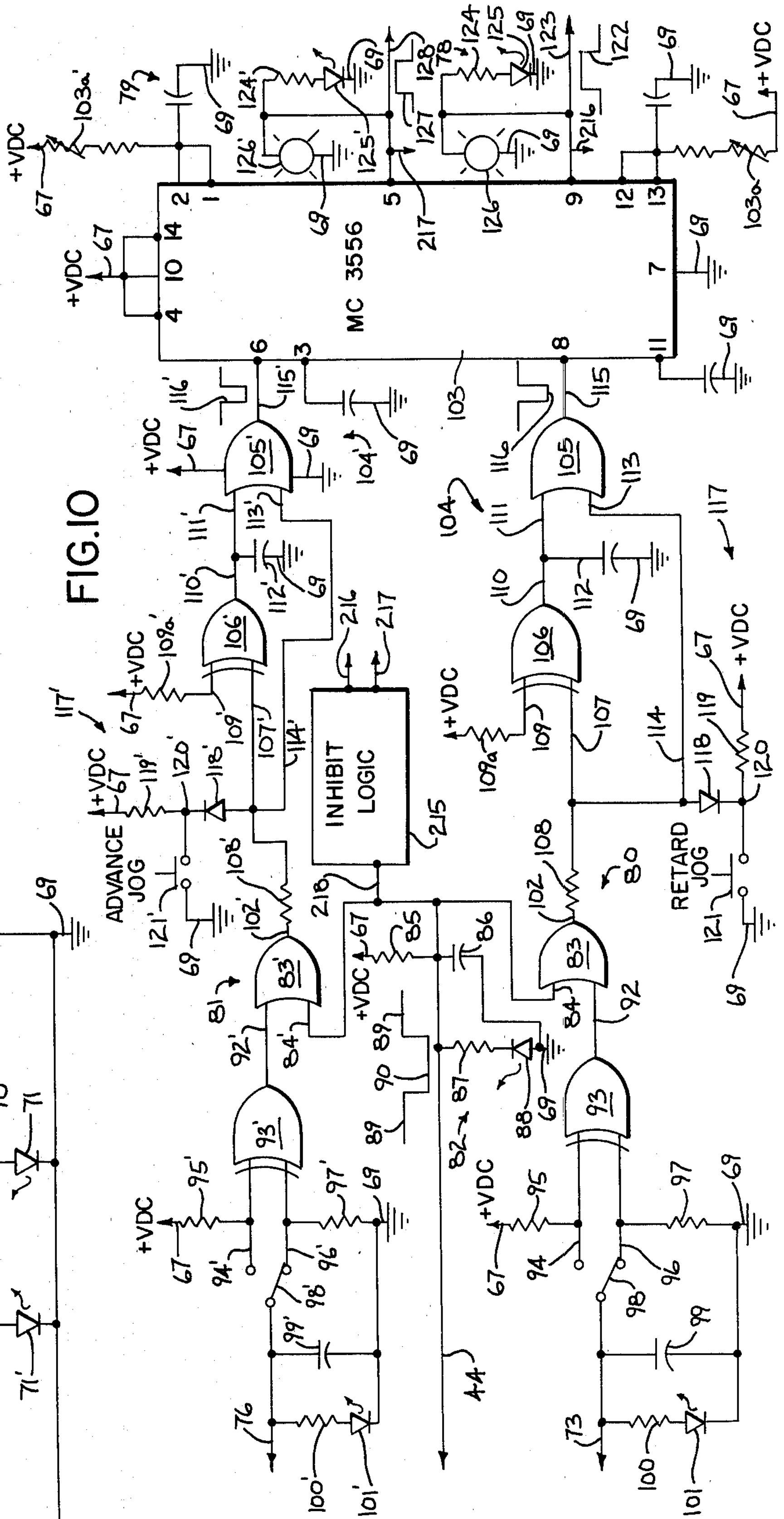
FIG. 10 is an electrical circuit schematic showing a portion of the electrical control of FIGS. 1 and 2.

A retard modification timing circuit 78 is connected to receive the output of a retard coincidence circuit 80 while an advance modification timing circuit 79 is connected to receive the output of an advance coincidence circuit 81, as more fully illustrated in FIG. 10. The pair of coincidence circuits 80 and 81 are mutually connected to receive the output from the registration scanner 45 through the connecting circuit 44 and a coupling circuit 82. The coincidence circuit 80 includes an OR gate 83 having an input 84 connected to the scanner circuit 44 through the coupling circuit 82. Specifically, the input circuit 44 is connected to the constant positive potential source lead 67 through a connecting resistor 85 and is also coupled to the system ground 69 through a capacitor 86 which, in turn, is parallel connected to a circuit including a resistor 87 and a light emitting diode 88.

When scanner 45 is located between adjacent marks 34, a logic "1" output signal, as illustrated at 89, exists at connecting circuit 44. When scanner 45 senses a mark 34, its output transfers to a logic "0" signal, as illustrated at 90, and indicates the detection of mark 34. The mark responsive logic "0" signal 90 appears at input 84 of OR gate 83 while capacitor 86 discharges through LED 88 to provide a visual signal indicating the sensing of mark 34 by scanner 45. When a mark 34 is no longer sensed by scanner 45, the output at connecting circuit 44 reverts to logic "1" as illustrated at 89.

An input 92 of OR gate 83 is connected to the connecting circuit 73 through an EXCLUSIVE-OR gate 93 and associated input circuitry. Specifically, an input 94 of OR gate 93 is connected to the positive potential source lead 67 through a connecting resistor 95 while an input 96 is connected to the system common 69 through a connecting resistor 97. A manually operable switch arm 98 is fixedly connected to the connecting circuit 73 and is selectively rotatable to be in contact with either the input 94 for sensing a negative going signal or with input 96 for sensing a positive going signal. It will be assumed that switch arm 98 is in constant engagement with input 96. The connecting circuit 73 is also connected to the system neutral 69 through a connecting capacitor 99 which, in turn, is parallel connected with a circuit including a resistor 100 and a light emitting diode 101.

With a retard logic "1" pulse appearing at connecting circuit 73, logic "1" signals will appear at both inputs 94 and 96 and the EXCLUSIVE-OR gate 93 will provide a logic "0" signal at input 92 of OR gate 83. The appearance of a logic "0" signal at input 84 indicates that scanner 45 has sensed the presence of a mark 34 while a logic "0" signal at input 92 indicates that a retard zone has been sensed by the function position sensor 49. The coincidence OR gate 83 responds to provide a logic "0" retard signal 80*a* at an output 102 to slow the speed of web 23 to regain proper registration.

The output 102 of coincidence circuit 80 is connected to a timer 103 through a pulse forming circuit 104 including an OR gate 105 and an EXCLUSIVE-OR gate 106. Specifically, an input 107 of the EXCLUSIVE-OR gate 106 is connected to the output circuit 102 through a connecting resistor 108 while an input circuit 109 is connected to the constant positive potential source lead 67 through a connecting resistor 109*a*. An output circuit 110 of the EXCLUSIVE-OR gate 106 is connected to an input 111 of the OR gate 105 and is also connected to the system neutral 69 through a timing capacitor 112. An input circuit 113 of the OR gate 105 is also connected to the output 102 of the coincidence circuit 80 through the resistor 108 and a connecting circuit 114. An output of the OR gate 105 is connected to an input 115 provided by timer 103.

In operation, a logic "0" retard signal 80*a* at output 102 of coincidence circuit 80 indicates that the mark 34 is sensed by scanner 45 and that the function position sensor 49 has sensed a retard condition. Such logic "0" signal is applied to input 107 of the EXCLUSIVE-OR gate 106 and to input 113 of the OR gate 105. The EXCLUSIVE OR gate 106 responds to the logic "0" at input 107 and provides a logic "1" signal at output 110. The input 111 of OR gate 105, however, remains at a logic "0" signal until the capacitor 112 charges to a sufficient magnitude so as to raise the potential at input 111 to the logic "1" level. Thus for an instant, such as one millisecond or less, logic "0" signals appear at both inputs 111 and 113 so that the OR gate 105 will provide a logic "0" signal to input 115 of timer 103, such as illustrated by the negative going pulse 116. When capacitor 112 charges to a sufficient level, a logic "1" signal appears at input 111 and the input 115 reverts to a logic "1" level to terminate the logic "0" pulse 116. Thus for every logic "0" coincidence pulse 80*a* appearing at output 102 of coincidence circuit 80, an extremely narrow width pulse 116 is provided at input 115 of timer 103. Such narrow width pulse 116 provides precise control and prevents any possibility of multiple triggering of the timer 103 if its input were greater than the output time period.

The input 107 of the EXCLUSIVE-OR gate 106 and the input 113 of the OR gate 105 are mutually connected to a manually operable retard jog circuit 117. Specifically, the inputs 107 and 113 are connected to the constant positive potential source lead 67 through a diode 118 and a resistor 119. A junction circuit 120 inter-connecting diode 118 to resistor 119 is connected to the system neutral circuit 69 through a manually operated connecting switch 121. Under automatic operation, a logic "0" coincidence signal appearing at output 102 will render diode 118 reverse biased so that the manually operable circuit 117 will have no effect upon the operating circuit. The manual operation of switch 121, on the other hand, will effectively connect the input circuits 107 and 113 to the system neutral 69 to induce an artificial logic "0" as inputs to the EXCLUSIVE-OR gate 106 and the OR gate 105 so that a narrow band width pulse 116 appears at input 115 of timer 103.

The timer 103 may be selected from any one of a number of comercial timing circuits, such as manufactured by Motorola under the designation MC3556. Under such commercial packaging, dual timing circuits are provided in each module which operate substantially independently for separate circuit operations.

The timer 103 operates in response to the narrow band width pulse 116 at input 115 to provide a precise, longer period retard command pulse 122 at an output circuit 123. While pulse 116 may only be one millisecond or less, the resulting retard command pulse 122 has a predetermined pulse width magnitude, such as approximately 200 milliseconds for example. An adjustable potentiometer 103*a* may be selectively adjusted to pre-establish a predetermined pulse width for the retard command pulse 122. The output circuit 123 is connected to the system ground 69 through a resistor 124 and a light emitting diode 125 and, alternatively, through an instrument panel light 126. Thus, the retard command pulse 123 operatively provides visual signals via LED 125 and instrument light 126 to signal a retard sequence of operation.

The advance coincidence circuit 81 in the upper portion of FIG. 10 responds to an advance pulse at connecting circuit 76 and a mark responsive pulse 90 at connecting circuit 44 to provide a coincidence pulse 81*a* at connecting circuit 102'. The advance modification timing circuit 79, in turn, responds to the advance coincidence pulse 81*a* to provide an advance command pulse 127 having a predetermined pulse width at an output circuit 128. In that the construction and operation of the advance coincidence and the advance modification timing circuits in the upper portion of FIG. 10 are substantially identical to the retard coincidence and the retard modification timing circuits previously described in the lower portion of FIG. 10, the substantially similar elements are designated with identical numbers primed and further discussion of such elements and their operation is deemed unnecessary. The timer 103 is also connected to the constant potential source lead 67 and to the system neutral lead 69 in a conventional manner as shown in FIG. 10.

The connecting circuits 123 and 128 are connected to opto-isolating circuits 129. Specifically, the opto-isolating circuits 129 include a pair of opto-isolators 130 and 131, which may consist of commercial components, such as provided by General Electric under the designation 4N26. In any event, the opto-isolator 130 includes a light emitting diode 132 having an anode circuit connected to the connecting circuit 123 and a cathode circuit connected to the connecting circuit 128 through a resistor 133. A collector circuit 134 of the associated light responsive transistor 135 is connected to an output circuit 136 of an operational amplifier 137 through a connecting circuit 138. An emitter circuit 139 of transistor 135 is connected to an input circuit 140 of the operational amplifier 137 through a connecting circuit 141 and a variable resistor 142. A variable resistor 143 is connected between the collector 134 and the emitter 139.

The opto-isolator 131 includes a light emitting diode 144 having an anode circuit connected to the connecting circuit 128 through a resistor 145 and a cathode circuit connected to the connecting circuit 123. The associated light responsive transistor 146 of opto-isolator 131 includes a collector circuit 147 connected to the tachometer 42 through the connecting circuit 43 and an emitter circuit 148 connected to the system common 69 through a variably tapped potentiometer 150 having an adjustable tap 151 connected to supply either a modified or a non-modified speed signal at an output circuit 152. A variable resistor 153 is connected between collector circuit 147 and the emitter circuit 148.

With logic "0" signals appearing at input circuits 123 and 128, the opto-isolating circuits 129 will be de-energized and the photo-transistors 135 and 146 are rendered non-conductive. In such situation, the speed signal $V_s$ appearing at connecting circuit 43 as supplied from tachometer 42 will be conducted through the adjustable resistor 153 and the variable potentiometer 150 to supply the non-modified speed signal at connecting circuit 152. Such non-modified speed signal at connecting circuit 152 will continuously vary in dependence upon the speed sensed by tachometer 42.

The modified or non-modified speed signal at the connecting circuit 152 is supplied to an input 154 of an amplifier 155 through a connecting resistor 156. The amplifier 155 is a conventional operational amplifier, such as marketed by Motorola under the designation MC1741C, and is connected in a conventional manner for amplifying the speed signal at input 154. For example, a tapped variable potentiometer 157 couples the input 154 to the system common 69 and the positive source lead 67 to provide an offset adjust to the operational amplifier 155. Also, an output circuit 158 is connected to an input circuit 159 through a variably tapped feedback resistor 160 which provides a gain adjustment for the amplifier 155. The other connections are clearly shown and standard for such an operational amplifier and need not be described in further detail.

The amplified speed signal at output 158 of amplifier 155 is applied to an input 161 of a phase locked loop voltage to frequency converter 162 through a connecting resistor 163. The converter 162 responds to the speed signal at input 161 and provides a series of pulses 164 at an output 165 having a frequency directly proportional to the magnitude of the speed signal at input 161. Such series of pulses 164 are applied to a base circuit 166 of a PNP type transistor 167 through a connecting resistor 168. An emitter circuit 169 of transistor 167 is connected to the constant positive potential circuit 67 while a collector circuit 170 is connected to the system common 69 through a connecting resistor 171 and a light emitting diode 172 of an opto-isolator 173. In operation, each pulse 164 momentarily renders the transistor 167 conductive to correspondingly energize the LED 172 to actuate the opto-isolator 173.

The opto-isolator 173 includes a photo transistor 174 having a photo responsive base circuit 175 coupled to a second system common 176 through a connecting resistor 177. An emitter circuit 178 is connected to the system common 176 while a collector circuit 179 is connected to a positive constant potential source voltage circuit 180 through a connecting resistor 181. The positive constant potential voltage appearing at circuit 180 is electrically isolated, such as through transformers, capacitors and the like, from the constant positive potential voltage appearing at circuit 67. Further, the potential at the system common 176 is optically isolated through the optical coupling circuit 173 from the potential at the system common 69. In effect, the circuits immediately following the opto-isolator 173 are electrically isolated from the circuits immediately preceeding such isolating circuit.

In operation, the photo transistor 174 is rendered conductive in response to the energization of the LED 172 which, in turn, operatively responds to each pulse 164. The conduction of phototransistor 174 operatively provides a digital output pulse at an input 182 of a phase locked loop 183 operated as a frequency to voltage converter. The converter 183 may be selected from a commercial source, such as marketed by Motorola under the designation MC14046B. In any event, the converter 183 provides an analog speed signal at an output 184 which is directly proportional to the frequency of the pulses appearing at input 182.

A maximum speed setting circuit 189 couples the analog speed signal at output 184 to the input circuit 140 of the operational amplifier 137. The maximum speed setting circuit 189 includes a resistor 190 which couples the output 184 to the system common 176 and a variably tapped coupling resistor 191 and a fixed resistor 192 which connect the output 184 to the input 140. The selectable adjustment of a tap 193 of variable potentiometer 191 pre-selects a maximum speed setting for the correction motor 35. A stabilizing and integrating capacitor 194 couples the output 136 to the input 140 of the operational amplifier 137 while a noninverting input 195 is coupled to the system common 176.

With the photo-transistor 135 of optoisolator 130 non-conductive, a feedback is established for operational amplifier 137 which connects the output 136 through variable resistor 143 and variable resistor 142 to the input 140. In such case, the analog speed signal appearing at input 140 is amplified and inverted by the operational amplifier 137 without being modified by any retard adjustment sequence.

The output 136 of inverting operational amplifier 137 is connected to an input 196 of an inverting operational amplifier 197. An output 198 of amplifier 197 is connected to provide the speed command signal $V_c$ to the motor control 38 through the connecting circuit 40 and is also connected through a feedback resistor 199 to the input 196. The input 196 is also coupled to the system common 176 through a minimum speed setting circuit 200. Specifically, a negative constant potential source lead 201 is connected to the system common 176 through a variably tapped potentiometer 202 having a tap connected to input 196 through a resistor 203. The impedance of potentiometer 202 may be manually adjusted to preset a minimum speed setting by establishing a limitation on the voltage level at input 196.

Figure 13B:
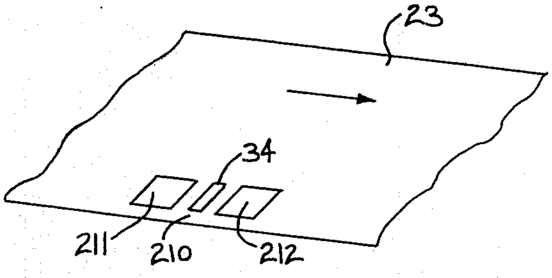
FIG. 13B is a diagram illustrating the relative position of a web mark corresponding to the dead zone sensing of FIG. 13A.
Figure 13A:
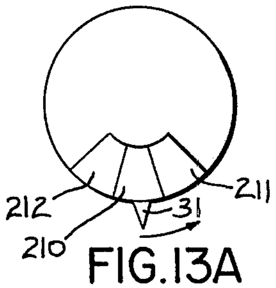
FIG. 13A is a diagram illustrating the relative positioning of a function roll of FIG. 1 with respect to a dead sensing zone.

The register control system 21 responds to an "in registration" sensed condition to provide continuing operation of the correction motor 35 without any retard or advance modification. The "in registration" sequence is diagramatically illustrated in FIGS. 13A and 13B. Specifically, FIG. 13A illustrates the positioning of the cutting blade 31 at a vertically downward position for severing the film 23 at the same time that the mark 34 is sensed within a dead zone 210 located between an advance correction zone 211 and a retard correction zone 212. The function position sensor 49 senses the "in register" condition, as illustrated in FIG. 13A, when the knife 31 is sensed at the dead zone 210 between the advance correction zone 211 and the retard correction zone 212 at the same time that the mark 34 is sensed by scanner 45.

Figures 11, 12:
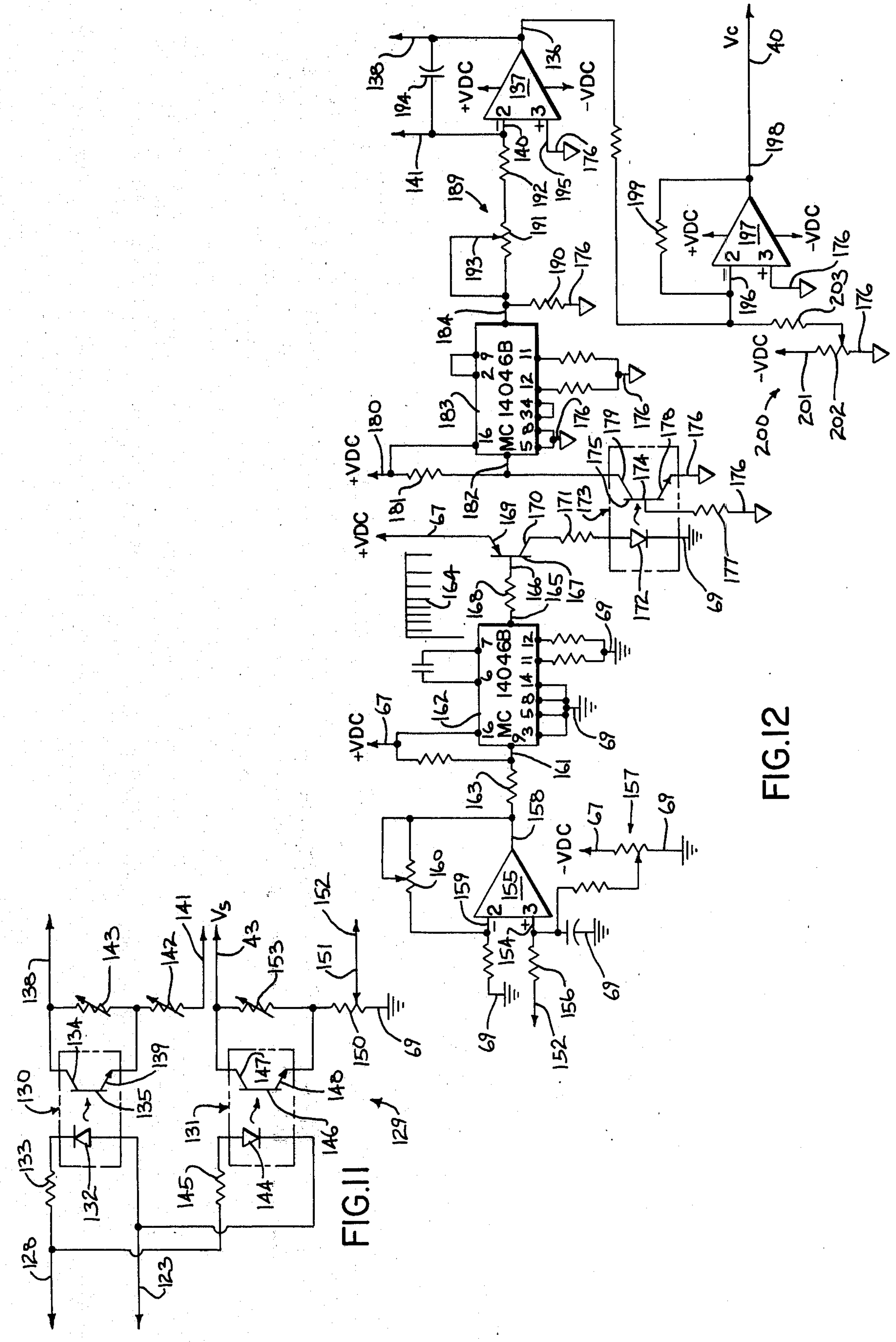
FIG. 11 is an electrical circuit schematic showing another portion of the electrical control of FIGS. 1 and 2.
FIG. 12 is an electrical circuit schematic showing another portion of the electrical control of FIGS. 1 and 2.

When an "in register" condition is sensed by the registration scanner 45 and the function position sensor 49, the sensors 59 and 60 provide logic "0" signals and the coincidence gates 80 and 81 remain at logic "1" indicating that correction is not required. Thus when an "in registration" condition occurs, the output circuits 123 and 128 of timer 103 remain at logic "0" and the photo-transistors 135 and 146 remain de-energized. The variable resistors 143 and 153 thus operatively remain connected so that the speed command modification circuit 213 as illustrated in FIGS. 11 and 12 continues to supply the speed command signal $V_c$ to continuously operate the correction motor 35 to rotate the draw roll 25 in direction 37 without any advance or retard modification.

Figure 14B:
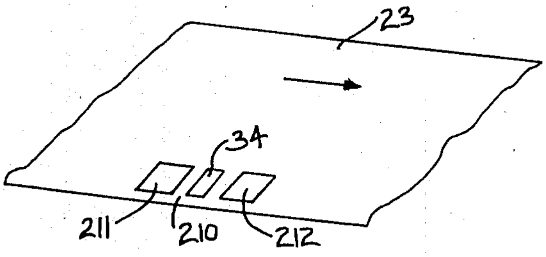
FIG. 14B is a diagram illustrating the relative position of the web mark corresponding to the advance zone sensing of FIG. 14A.
Figure 14A:
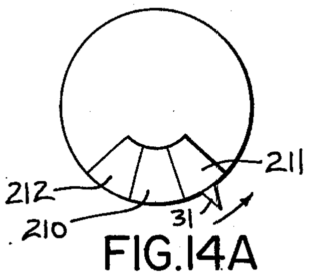
FIG. 14A is a diagram illustrating the relative positioning of the function roll of FIG. 1 with respect to an advance sensing zone.

FIGS. 14A and 14B illustrate an advance correction condition wherein the knife 31 of function roll 27 is sensed at the advance correction zone 211 by the function position sensor 49 as illustrated in FIG. 8 at the same time that the mark 34 is sensed by scanner 45. The sensed advance correction condition, as illustrated in FIG. 14A, indicates that the speed of web 23 is too slow and thereby requiring a speed correction for the correction motor 35 to synchronize the function roll 27 with the relative alignment of marks 34.

When a sensed advance correction condition exists, the sensor 59 provides a logic "1" signal. With the simultaneous sensing of a mark 34 by scanner 45, the coincidence circuit 81 responds to provide a logic "0" advance coincidence pulse 81*a* to the advance modification timing circuit 79. The timing circuit 79, in turn, responds to the advance coincidence pulse 81*a* and provides an advance command pulse 127 having a pre-established predetermined pulse-width for precisely commanding an advance modification.

The speed command modification circuit 213 responds to the advance command pulse 127 and operatively modifies the speed signal $V_s$ appearing at input 43 to provide a modified speed command signal $V_c$ at output 40 to increase the speed of web 23 by increasing the speed of correction motor 35. Thus when an advance correction condition is sensed, a logic "1" signal appears at connecting circuit 128 while a logic "0" signal remains at connecting circuit 123. With such inputs, the light emitting diode 144 is energized and the photo-transistor 146 energized to operatively provide a short circuit conducting path around the variable resistor 153. In such manner, the circuit impedance connecting the line tachometer 42 to the remainder of the modification circuit 213 is reduced for a predetermined period of time as determined by the pulse-width of pulse 127 to thereby modify the magnitude of the speed command signal $V_c$ and increase the speed of correction motor 35. Thus the operative removal of the impedance 153 in response to a sensed advance correction condition operatively increases the magnitude of the speed command signal $V_c$. The motor control 38 responds to the increased speed command signal $V_c$ to operatively increase the rotative speed of the correction motor 35 which continues to operate in direction 37.

Figure 15B:
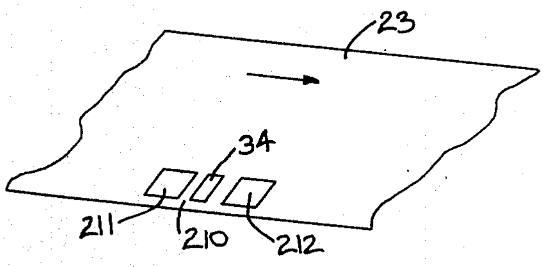
FIG. 15B is a diagram illustrating the relative position of the web mark corresponding to the retard zone sensing of FIG. 15A.
Figure 15A:
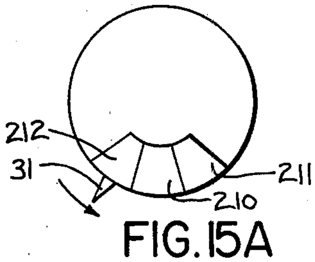
FIG. 15A is a diagram illustrating the relative positioning of the function roll of FIG. 1 with respect to a retard sensing zone.

When a retard correction condition exists, the function position sensor 49 senses the positioning of the cutting blade 31 in the retard correction zone 212, as illustrated in FIGS. 6 and 15A. The sensor 60 responds to provide a logic "1" retard pulse. With a mark 34 simultaneously sensed by the registration scanner 45, the coincidence circuit 80 operatively responds to the retard pulse to provide a logic "0" retard coincidence pulse 80*a* to the retard modification timing circuit 78. The timing circuit 78, in turn, responds to the retard coincidence pulse 80*a* and provides a retard command pulse 122 having a pre-established predetermined pulse-width for precisely commanding a retard modification.

The speed command modification circuit 213 responds to the retard command pulse 122 and operatively modifies the speed signal $V_s$ appearing at input 43 to provide a modified speed command signal $V_c$ at output 40 to decrease the speed of web 23 by decreasing the speed of correction motor 35. Thus when a retard correction condition is sensed, a logic "1" signal appears at circuit 123 while a logic "0" signal appears at circuit 128 to thereby energize the light emitting diode 132 and the phototransistor 135. The conduction of photo-transistor 135 operatively short circuits the impedance 143 to thereby decrease the feedback impedance for the operational amplifier 137. With the feedback impedance reduced, the output of operational amplifier 137 is reduced in response to the sensed retard correction condition so that the speed command signal $V_c$ is correspondingly reduced. Thus in a sensed retard correction condition, the speed command signal $V_c$ is modified to be reduced and the motor control 38 responds to reduce the operating speed of correction motor 35 so that the draw roll 25 will continue to rotate in direction 37 but at a reduced speed. In such manner, a retard correction is provided to slow down the speed of web 23 to seek registration between a sensed mark 34 and the positioning of the cutting knife 31 of the function roll 27.

The register control system 21 provides a highly accurate response by monitoring a predefined dead zone 210, advance correction zone 211 and retard correction zone 212 to selectively control and adjust the operating speed of the draw roll 25 as it rotates in direction 37. The correction motor 35 is continuously operated in the rotating direction 37 under all conditions in response to the speed signal $V_s$ as sensed at the main drive motor 29. When an advanced correction condition is sensed, the speed signal $V_s$ is operatively modified to increase the speed command signal $V_c$ to thereby operatively increase the rotating speed of correction motor 35. When a retard correction condition is sensed, the speed signal $V_s$ is operatively modified to decrease the speed command signal $V_c$ to thereby operatively decrease the rotating speed of correction motor 35.

Thus in all operating sequences, including the "in registration" condition, the advanced correction condition and the retard correction condition, the draw roll 25 always rotates in the same direction 37 and only the speed thereof is controlled for the accurate control of web 23 for precise registration.

If desired, an optional inhibit circuit 215 may be added to the advance and retard modification timing circuits 78 and 79. Specifically, the output circuit 123 of timer 103 is connected through connecting circuit 216 as an input to inhibit logic 215 while the output circuit 128 of timer 103 is connected through connecting circuit 217 as an input to inhibit logic 215. An advance command pulse 127 at output 128 causes the inhibit logic 215 to provide a logic "1" inhibit signal at the input 84 of the OR gate 83 via the connecting circuit 218 to thereby inhibit the retard modification timing circuit 78. A retard command pulse 122 at output 123 causes the inhibit logic 215 to provide a logic "1" inhibit signal at the input 84' of the OR gate 83' through the connecting circuit 218 to thereby inhibit the advance modification timing circuit 79. The inhibit control 215 may comprise any conventional logic conversion circuits which respond to a logic "1" input to provide a corresponding logic "1" output to the appropriate circuitry.

Figure 16:
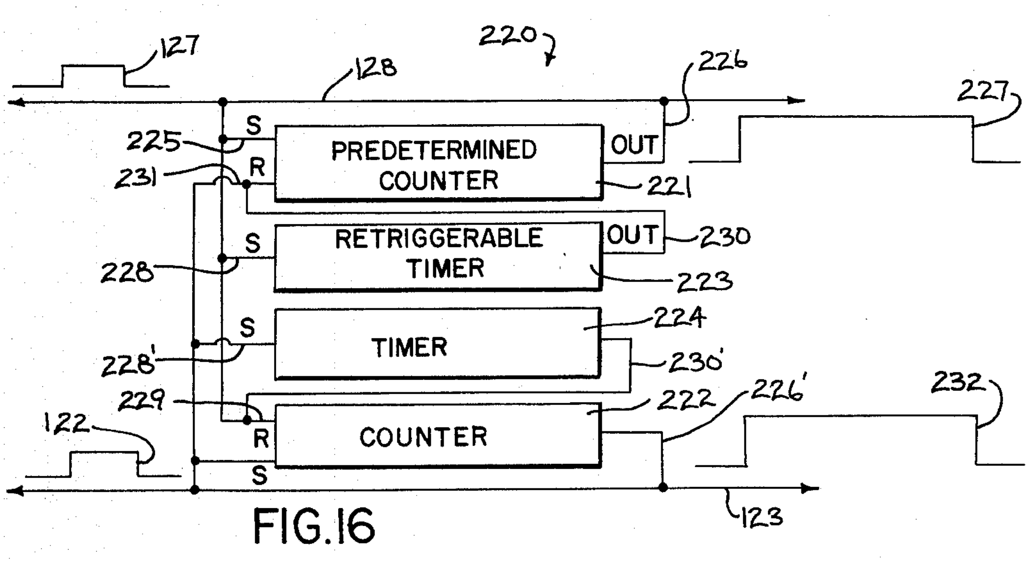
FIG. 16 is an electrical circuit schematic showing a modification which may be included in the electrical control of FIGS. 1 and 2.

A second timing circuit 220 may be included in the retard and advance modification timing circuits 78 and 79 to provide a second added advance or retard response under certain sensed conditions. With reference to FIG. 16, a pair of counters 221 and 222 and associated retriggerable timers 223 and 224 are inter-connected between the output circuits 123 and 128 of timer 103.

The counter 221 has a set input 225 connected to the circuit 128 to respond and count each advance command pulse 127. If counter 221 is permitted to sequentially count a predetermined number of pulses 127 in a predetermined period of time, an output circuit 226 will provide a logic "1" advance command pulse 227 which has a significantly longer pulse width than the advance command pulse 127. Such broad width advance command pulse 227 is supplied through the connecting circuit 128 to the speed command modification circuit 213 and modifies the system operation as above described for the advance command pulse 127 except that the applied modification to the speed signal $V_s$ occurs for a significantly greater predetermined period of time.

Each pulse 127 on connecting circuit 128 is also applied to an input 228 to provide a set input to the retriggerable timer 223 and to an input 229 to reset the counter 222. The occurrence of a logic "1" advance command pulse 127 at input 228 will condition timer 223 to provide a logic "0" pulse at an output 230 for a predetermined period of time. If another subsequent pulse 127 is not received within a predetermined period of time, the timer 223 times out to provide a logic "1" signal at output 230 which, in turn, is supplied as a resetting input at the reset terminal 231 of the counter 221. Thus if timer 223 times out, the counter 221 will be reset and conditioned for another counting sequence. In such manner, the counter 221 will respond to a predetermined number of pulses 127 to provide the output pulse 227 only if such pulses 127 occur at a sufficient frequency to prevent the timer 223 from timing out.

The counter 222 and timer 224 operate in a similar manner as described with respect to counter 221 and timer 223 so that similar numbers primed will be used to designate similar elements and further discussion thereof is deemed unnecessary. The counter 222 will respond to a predetermined number of pulses 122 occurring within a predetermined time to provide a broad width retard command pulse 232 through the connecting circuit 123 to the speed command modification circuit 213 and modifies the system as above described for the retard command pulse 122 except that the applied modification to the speed signal $V_s$ occurs for a significantly greater predetermined period of time.

The timers 223 and 224 may be selected from any suitable commercial source, such as provided by the Warner Electric Brake and Clutch Company of Beloit, Wisconsin under the Model No. MCS-811. The counters 221 and 222 also may be selected from any suitable commercial source, such as provided by Banner under the designation BIC-99. It is understood that appropriate associated capacitors, resistors, diodes, etc. would be used in a customary manner to interface such timers and counters.

The invention provides numerous unique sequences of operation which provide reliable registration in response to numerous sensed operating conditions.

Various modes of carrying out the invention are contemplated as being within the scope of the following claims particularly pointing out and distinctly claiming the subject matter which is regarded as the invention.

I claim:

1. A register control for web handling apparatus having drive motive means operatively moving a web containing repetitive indicia and a sequentially operating function apparatus performing repetitive operations on said web corresponding to said repetitive indicia and corrective motive means positively rotating an associated drive roll which engages and moves said web in a predetermined relationship with respect to said drive motive means, said register control comprising first sensing means operatively connected to said drive motive means to provide a speed responsive signal, second sensing means operatively connected to said function apparatus to provide a function indicating signal, third sensing means operatively scanning said web to provide an indicia indicating signal, and modification means operatively connected to said first, second and third sensing means and operable between a first condition providing a first speed command signal to operate said corrective motive means in direct response to said speed responsive signal when the operation of said function apparatus is in register with said indicia and a second condition providing a second speed command signal responsive to said speed responsive signal modified in response to said function indicating signal and said indicia indicating signal to operate said corrective motive means when the operation of said function apparatus is out of register with said indicia to thereby vary the operating speed of said corrective motive means to regain registration between said function apparatus and said indicia.

2. The register control of claim 1, and including a full wave thyristor controlled drive operatively responding to said first and second speed command signals to supply corresponding amounts of energy to said corrective motive means to control the speed of said web by said corrective motive means relative to the sensed speed of said drive motive means.

3. The register control of claim 1, wherein said second sensing means includes a member connected to rotate in synchronism with the repetitive operation of said function apparatus, a first permanent magnet connected to said member, a second permanent magnet connected to said member and circumferentially spaced from said first permanent magnet, a first magnetic sensor connected to monitor the magnetic field strength of said first magnet, and a second magnetic sensor connected to monitor the magnetic field strength of said second magnet, said first and second magnetic sensors angularly adjustable with respect to each other to provide a predefined dead sensing zone and a selectively adjustable advance sensing zone and retard sensing zone with said first magnetic sensor providing an advance pulse in response to said first magnet being within said advance zone and said second magnetic sensor providing a retard pulse in response to said second magnet being within said retard zone.

4. The register control of claim 1, wherein said modification means includes a first selectively variable modification circuit connected to receive said speed responsive signal and operable between a first mode to provide a non-modified speed output signal and a second mode to provide an advance modified output signal operatively providing said second condition in response to said function indicating signal and said indicia indicating signal, an analog-to-digital converter operatively connected to said first variable circuit and providing a digital output having a frequency proportional to the magnitude of said non-modified or advance modified speed output signal, an opto-isolator having an input operatively connected to said analog-to-digital converter to respond to said digital output and providing an optically isolated digital output corresponding in frequency to said digital output, a digital-to-analog converter operatively connected to receive said optically isolated digital output from said opto-isolator to provide an analog output having a magnitude proportional to said digital output, and a second selectively variable modification circuit connected to receive said analog output and operable between a first operating mode to provide a non-modified output and a second operating mode to provide a retard modified response for providing said second condition in response to said function indicating signal and said indicia indicating signal.

5. The register control of claim 1, and including an advance coincidence circuit connected to said second and third sensing means to provide an advance coincidence pulse in response to the simultaneous occurrence of said indicia indicating signal and a first function indicating signal, an advance modification timing circuit connected to said advance coincidence circuit and providing an advance command pulse of a predetermined advance duration in response to said advance coincidence pulse to operatively transfer said modification means from said first condition to said second condition to increase the speed of said corrective motive means for said predetermined advance duration, a retard coincidence circuit connected to said second and third sensing means to provide a retard coincidence pulse in response to the simultaneous occurence of said indicia indicating signal and a second function indicating signal, and a retard modification timing circuit connected to said retard coincidence circuit and providing a retard command pulse of a predetermined retard duration in response to said retard coincidence pulse to operatively transfer said modification means from said first condition to said second condition to decrease the speed of said corrective motive means for said predetermined retard duration.

6. A register control for web handling apparatus having drive motive means operatively moving a web containing repetitive indicia and a sequentially operating function apparatus performing repetitive operations on said web corresponding to said repetitive indicia and corrective motive means positively rotating an associated nip roll to engage and move said web in the same operative direction as provided by said drive motive means, said register control comprising drive means responding to a speed command signal to energize said corrective motive means to operatively rotate said nip rolls at a speed relating to said speed command signal and speed control means including sensing means responding to the speed of said drive motive means and the position of said function apparatus and the position of said indicia to provide said speed command signal for controlling the operating speed of said nip rolls to maintain registration between said function apparatus and said indicia.

7. The register control of claim 6, wherein said drive means includes a thyristor controlled circuit operating to energize said corrective motive means in response to said speed command signal.

8. A register control for web handling apparatus having motive means operatively moving a web containing repetitive indicia and a sequentially operating function apparatus performing repetitive operations on said web corresponding to said repetitive indicia, said register control comprising sensing means responding to the speed of said web handling apparatus to provide a speed related signal and responding to the position of said function apparatus and the position of said indicia to provide a coincidence signal in response to said function apparatus being out of register with said indicia, and timing means operatively connected to said sensing means and to said motive means to vary the operating speed of said motive means for a predetermined period of time in response to said coincidence signal and said speed signal to regain registration between said function apparatus and said indicia.

9. The register control of claim 8, wherein said timing means includes means responding to a plurality of coincidence signals within a predetermined time to vary the operating speed for said motive means for a second predetermined period of time greater than said first predetermined period of time to regain registration between said function apparatus and said indicia.

10. A register control for web handling apparatus having motive means operatively moving a web containing repetitive indicia and a sequentially operating function apparatus performing repetitive operations on said web corresponding to said repetitive indicia, said register control comprising drive means responding to a speed command signal to energize said motive means to move said web at a speed relating to said speed command signal, sensing means operatively connected to said web handling apparatus and providing a speed signal indicative of an operating speed of said web handling apparatus, modifying means operatively connected to said sensing means and to said drive means to provide said speed command signal in response to said speed signal and selectively operable between a first condition to provide a first speed command signal and a second condition to provide a second speed command signal, and transfer means operatively connected to respond to the position of said function apparatus and the position of said indicia to transfer said modifying means from said first condition to said second condition in response to said function apparatus being out of register with said indicia to provide said second speed command signal to modify the operation of said drive means to regain registration between said function apparatus and said indicia.

11. The register control of claim 10, wherein said modifying means includes an operational amplifier having an input operatively connected to said sensing means through impedance means and an output operatively providing said first and second speed command signals, and said transfer means includes switch means connected to said impedance means and operable between a first condition to provide a first operative impedance operatively providing said first speed command signal and a second condition to provide a second operative impedance operatively providing said second speed command signal.

12. The register control of claim 10, wherein said modifying means includes an operational amplifier having an input operatively connected to said sensing means and an output operatively providing said first and second speed command signals and having feedback impedance means coupling said amplifier output with said amplifier input, and said transfer means includes switch means connected to said feedback impedance means and operable between a first condition to provide a first operative impedance operatively providing said first speed command signal and a second condition to provide a second operative impedance operatively providing said second speed command signal.

13. The register control of claim 10, wherein said modifying means includes an analog-to-digital converter operatively connected to said sensing means and providing a digital output having a frequency relating to the magnitude of said speed signal, an opto-isolator having an input operatively connected to said analog-to-digital converter to respond to said digital output and providing an optically isolated digital output corresponding in frequency to said digital output, and a digital-to-analog converter operatively connected to receive said optically isolated digital output from said opto-isolator and operatively providing an analog speed command signal having a magnitude relating to said digital output.

14. A register control for web handling apparatus having motive means operatively moving a web containing repetitive indicia and a sequentially operating function apparatus performing repetitive operations on said moving web corresponding to said repetitive indicia, said register control comprising (A) sensing means operatively connected to said function apparatus and including
   (1) a member connected to rotate in synchronism with the repetitive operation of said function apparatus,
   (2) a first permanent magnet connected to said member,
   (3) a second permanent magnet connected to said member and circumferentially spaced from said first permanent magnet,
   (4) a first magnetic sensor connected to monitor the magnetic field strength of said first magnet, and
   (5) a second magnetic sensor connected to monitor the magnetic field strength of said second magnet,
   said first and second magnetic sensors angularly adjustable with respect to each other to provide a predefined dead sensing zone and a selectively adjustable advance sensing zone and retard sensing zone with said first magnetic sensor providing an advance pulse in response to said first magnet being within said advance zone and said second magnetic sensor providing a retard pulse in response to said second magnet being within said retard zone, and (B) modification means operatively connected to said sensing means and to said web handling apparatus and operable between a first condition occurring when the operation of said function apparatus is in register with said indicia and a second condition occurring in response to either one of said advance pulse and said retard pulse when the operation of said function apparatus is out of register with said indicia to vary the operation of said web handling apparatus to regain registration between said function apparatus and said indicia.

15. A register control system for web handling apparatus having first and second draw rolls sandwiching a substantially continuous web of pliable film therebetween, first and second function rolls sandwiching said web therebetween with said first function roll providing an operation on said web, and an electrical drive motor operatively connected to said second function roll to rotate said first and second function rolls to thereby move said web through said web handling apparatus and provide an operation on said web by said first function roll, said register control system comprising (A) a correction motor operatively rotating said first draw roll in a first direction to control the speed of the web passing between said first and second draw rolls, (B) a full wave regenerative, thyristor controlled motor speed control having an output connected to continuously and variably control the operation of said correction motor, (C) a tachometer connected to said drive motor to provide a line speed electrical signal having a relationship to the web speed at said first and second function rolls, (D) a registration scanner including a photo-responsive circuit to sense a plurality of web containing marks each indicative of a single repetitive pattern on said web to provide a mark detection pulse for each sensed mark;

(E) a function position sensor connected to said first function roll and including (1) a disc connected to rotate in synchronism with the rotation of said first function roll, (2) a first permanent magnet connected to said disc, (3) a second permanent magnet connected to said disc and circumferentially spaced from said first permanent magnet, (4) a first magnetic sensor connected to monitor the magnetic field strength of said first magnet, (5) a second magnetic sensor connected to monitor the magnetic field strength of said second magnet, said first and second magnetic sensors angularly adjustable with respect to each other to provide a predefined dead sensing zone and a selectively adjustable advance sensing zone and retard sensing zone with said first magnetic sensor providing an advance pulse in response to said first magnet being within said advance zone and said second magnetic sensor providing a retard pulse in response to said second magnet being within said retard zone, (F) registration control circuit means connected to receive said line speed signal, said mark detection pulse, said advance pulse and said retard pulse and providing a speed comand signal to said motor speed control to operatively control the operating speed of said correction motor, said registration control circuit means providing (1) a speed command modification circuit including (a) a first selectively variable modification circuit connected to receive said line speed signal and operable between a first condition to provide a non-modified speed output signal and a second condition to provide an advance modified speed output signal, (b) an analog-to-digital converter operatively connected to said first selectively variable circuit and providing a digital output having a frequency proportional to the magnitude of said non-modified or advance modified speed output signals, (c) an opto-isolator having an input operatively connected to said analog-to-digital converter to respond to said digital output and providing an optically isolated digital output corresponding in frequency to said digital output, (d) a digital-to-analog converter operatively connected to receive said optically isolated digital output from said opto-isolator to provide an analog output having a magnitude proportional to said digital output, and (e) a second selectively variable modification circuit connected to receive said analog output and operable between a first condition to provide a non-modified response and a second condition to provide a retard modified response for providing said speed command signal to said motor speed control, (2) an advance coincidence circuit connected to said registration scanner and to said function position sensor to provide an advance coincidence pulse in response to the simultaneous occurrence of said mark detection pulse and said advance pulse, (3) an advance modification timing circuit connected to said advance coincidence circuit and to said first modification circuit to provide an advance command pulse of a predetermined duration in response to said advance coincidence pulse to transfer said first modification circuit from said first condition to said second condition to provide said advance modification output for said predetermined duration to correspondingly modify said speed command signal for said predetermined duration to increase the speed of said correction motor for increasing the web speed to regain registration between each sensed mark and the positioning of said first function roll, (4) a retard coincidence circuit connected to said registration scanner and to said function position sensor to provide a retard coincidence pulse in response to the simultaneous occurrence of said mark detection pulse and said retard pulse, and (5) a retard modification timing circuit connected to said retard coincidence circuit and to said second modification circuit to provide a retard command pulse of a predetermined duration in response to said retard coincidence pulse to transfer said second modification circuit from said first condition to said second condition to provide said retard modification response for said predetermined duration to correspondingly modify said speed command signal for said predetermined duration to decrease the speed of said correction motor for decreasing the web speed to regain registration between each sensed mark and the positioning of said first function roll.

* * * * *

UNITED STATES PATENT AND TRADEMARK OFFICE
CERTIFICATE OF CORRECTION

PATENT NO. : 4,361,260

DATED : November 30, 1982

INVENTOR(S) : MARC ALAN HANLAN

It is certified that error appears in the above-identified patent and that said Letters Patent are hereby corrected as shown below:

Column 8, Line 22 - after "O" insert ---signal---

Column 8, Line 45 - cancel "123" and substitute therefor ---122---

Signed and Sealed this

*Twenty-ninth* Day of *March 1983*

[SEAL]

*Attest:*

GERALD J. MOSSINGHOFF

*Attesting Officer* *Commissioner of Patents and Trademarks*